United States Patent [19]

Kang et al.

[11] Patent Number: 4,841,763
[45] Date of Patent: Jun. 27, 1989

[54] PACKAGE SEAL INSPECTION SYSTEM

[75] Inventors: Samsuk Kang, Monroeville; Frank M. Bordelon, Export, both of Pa.

[73] Assignee: Westinghouse Electric Corp., Pittsburgh, Pa.

[21] Appl. No.: 156,671

[22] Filed: Feb. 17, 1988

[51] Int. Cl.⁴ .............................................. G01M 3/00
[52] U.S. Cl. ....................................... 73/49.3; 73/52
[58] Field of Search ......................... 73/49.3, 52, 49.2

[56] References Cited

U.S. PATENT DOCUMENTS

| | | | |
|---|---|---|---|
| 3,314,283 | 4/1967 | Fitzpatrick et al. | 73/40 |
| 3,441,132 | 4/1969 | Browning | 73/52 |
| 3,918,293 | 11/1975 | Feigel | 73/49.3 |
| 4,024,956 | 5/1977 | Cassidy | 73/49.3 |
| 4,187,718 | 2/1980 | Shibasaki | 73/52 |
| 4,313,171 | 1/1982 | Shibasaki | 73/52 X |
| 4,399,514 | 8/1983 | Hamasaki et al. | 73/52 X |
| 4,625,545 | 12/1986 | Holm et al. | 73/40 |
| 4,697,452 | 10/1987 | Prakken | 73/49.2 |

Primary Examiner—Michael J. Tokar
Assistant Examiner—Hezron E. Williams

[57] ABSTRACT

A package seal inspection system for detecting leaks in a sealed package which includes a box having a plurality of louvers mounted in a front wall, a plurality of strips mounted behind the louvers in the box, means mounted in the box behind the strips for detecting movement of the strips, means for supporting the package in front of the louvers and means for applying pressure to the top of the package whereby when a leak is present, air in the package is forced out and through the louvers to cause one or more of the strips to move and be detected by the detecting means.

13 Claims, 2 Drawing Sheets

PACKAGE SEAL INSPECTION SYSTEM

BACKGROUND OF THE INVENTION

1. Field of Invention

The invention relates to a package seal inspection system for detecting air leaks in a sealed package.

2. Description of the Related Art

In certain packaging operations, it is necessary to maintain a substantially air tight seal between the tray or body of the package and a lid mounted thereon. This is particularly true in connection with food packaging wherein it is conventional to fill a tray with food and then heat seal a lid thereon. Although completely air tight seals are not required, it is desirable to detect leaks of a certain magnitude, known as gross leaks. For a typical package with a lid parameter of approximately 30 inches, any leak over one half inch is considered a gross leak.

Currently leak testing of food packages such as those used for frozen foods, is done manually. In such testing, an inspector presses down on a package lid and, if the lid offers sufficient resistance, according to the inspectors judgment, the package is deemed sufficiently air tight. If the lid yields easily, however, this indicates a gross leak and the product is discarded.

The manual system of testing for leaks has many disadvantages. It is expensive due to the cost in man hours and also results in inconsistent judgments due to the vagaries of the judgment of individual human beings. Moreover, individual inspectors are subject to fatigue and stress which are a major cause of the inability of the inspector to fully concentrate and remain alert. Consequently low quality products and low productivity result. The manual method for checking for leaks makes standardization very difficult, if not impossible.

SUMMARY OF THE INVENTION

It is an object of the present invention to provide a package seal system for detecting leaks in a sealed package which reduces the amount of manual labor required and is cost effective.

It is a further object of the invention to provide a package seal inspection system for detecting leaks in a sealed package which is fast and which is consistent and efficient in operation.

The invention achieves the above objects by providing a package seal inspection system for detecting leaks in a sealed package which includes a box having front and back walls with a plurality of angularly adjustable louvers mounted in the front wall. A plurality of strips of lightweight material are mounted in the box behind the louvers. Means are mounted in the box behind the strips for detecting movement of the strips. Means such as a conveyor are provided for supporting the package in front of the louvers. Means such as a solenoid are also provided for applying pressure to the surface of the package whereby when a leak is present in the package, air in the package is forced out therefrom and through the louvers to cause one or more of the strips to move and be detected by the detecting means. The detecting means may comprise a light emitter such as an infrared emitter and a light detector. The box may include an opening in one of the walls for the exit of air therefrom. The system further may include a plurality of boxes with detecting means therein mounted along the conveyor.

These, together with other objects and advantages, which will be subsequently apparent, reside in the details of the construction and operation of the invention as more fully described and claimed hereafter, reference being made to the accompanying drawings forming a part hereof, wherein like numerals refer to like parts throughout.

DESCRIPTION OF THE PREFERRED EMBODIMENTS

Figure 1:
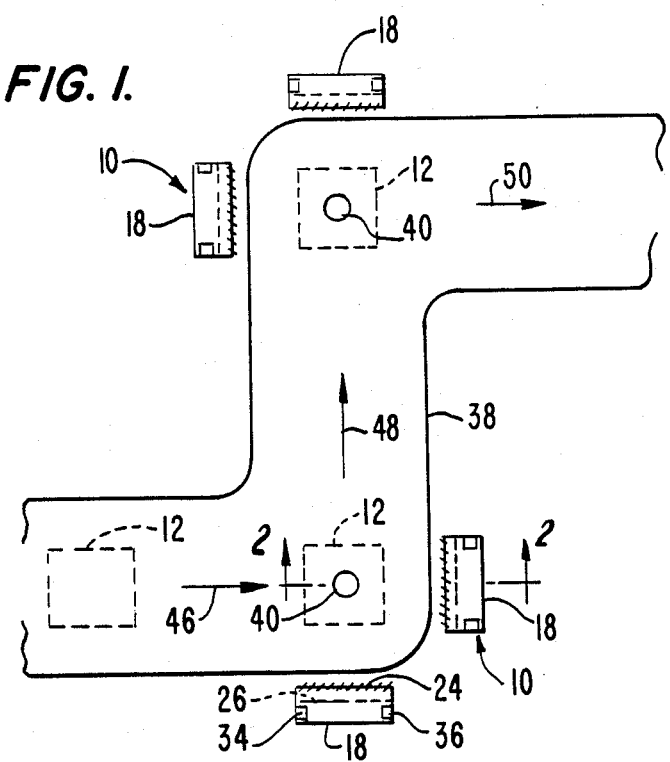
FIG. 1 is a top plan view of a package seal inspection system according to the present invention showing a plurality of boxes with detecting means therein mounted on each side of a conveyor for detecting leaks in packages being transported by the conveyor.
Figure 2:
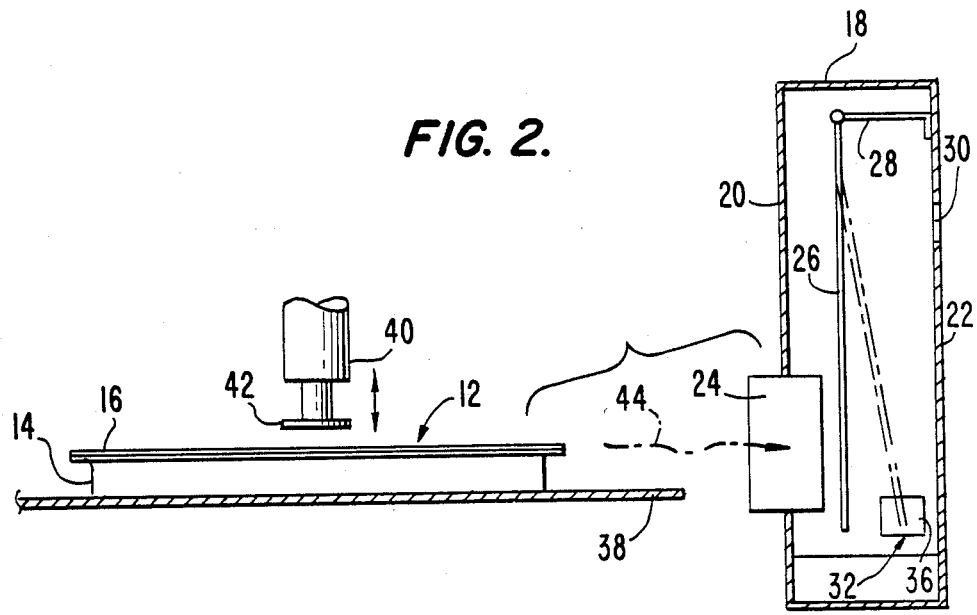
FIG. 2 is a cross-sectional view taken along line 2—2 of FIG. 1.
Figure 3:
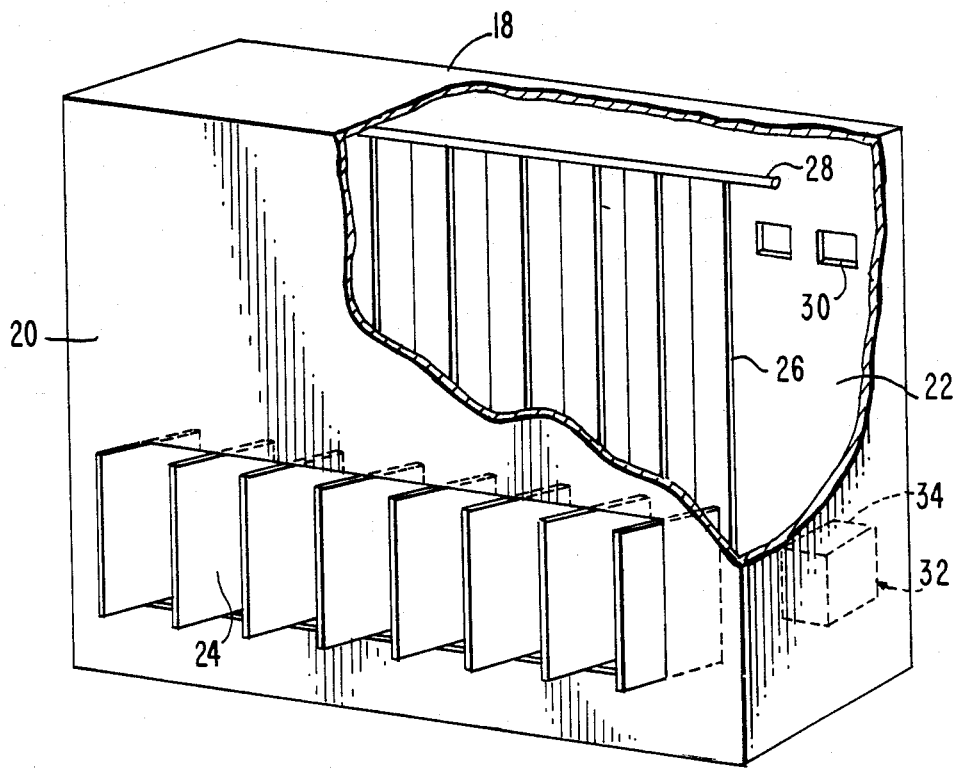
FIG. 3 is a perspective view, partially broken away, showing a box containing detecting means therein.

Referring to the drawings, shown in FIGS. 1, 2 and 3 is a package seal inspection system, generally indicated by the numeral 10, for detecting leaks in a sealed package 12 such as that used to hold frozen foods. The system 10 is particularly useful in connection with detecting leaks in packages having a bottom tray or body 14 having a lid 16 sealed to the body at the top thereof.

The inspection system includes a box 18 having a front wall 20 and a back wall 22. A plurality of angularly adjustable louvers 24 are mounted in the front wall 20 adjacent the lower end thereof. The louvers 24 are pivotally connected at the mid point of their tops and bottoms to front wall 20 whereby the louvers may be pivoted between an open position as shown in FIG. 3 and a closed position. In this manner, the size of the openings between the louvers may be adjusted as necessary. A plurality of strips 26 of a suitable lightweight material such as paper or plastic are mounted in the box 18 so that their lower ends hang just behind the louvers 24. As best shown in FIG. 2, the strips 26 may hang from a suitable bracket 28 attached to the back wall 22 of the box 18 adjacent the top thereof. A plurality of openings 30 preferably are provided in back wall 22 towards the upper end thereof to provide a means for air to exit from inside the box.

Suitable detecting means, generally indicated by the numeral 32, are mounted in box 20 at a position behind the strips 26 adjacent the lower end of the box. A suitable detecting means comprises a light emitter 34 and a light detector 36. The light emitter may be an infrared emitter and the detector may be an infrared detector.

Suitable means such as conveyor 38 are provided to support the package 12 at a position just in front of and at the same height as louvers 24. As shown in FIG. 2, each package 12 is preferably supported at a height wherein the lid 16 is at a level which is approximately the mid point of the height of the louvers. Suitable pressure applying means such as a solenoid 40 having a pressure pad 42 attached at the lower end thereof are mounted above conveyor 38 at a position adjacent the louvers 24 as shown in FIG. 2.

In operation of the package seal inspection system just described, a package 12 is moved by conveyor 38 to a position just in front of box 18 at approximately the same height as the louvers 24. Solenoid 40 is then activated to cause pressure pad 42 to strike the lid 16 of package 12. If a leak is present on the side of the package facing the louvers, air will be forced out through the leak and will pass through the louvers 24 as indicated by arrow 44 in FIG. 2. The air passing through the louvers 24 then pushes one or more of strips 26 into the path between the light emitter 34 and the light detector 36 as shown by the dashed lines in FIG. 2. This causes the signal received by the detector from the emitter to be momentarily disrupted. The detector 36 then closes a switch activating an appropriate mechanical response to remove the package from the conveyor 38. Although not shown in the drawings, any suitable mechanical means may be used for removing the package from the conveyor such as an additional solenoid at one side of the conveyor and an inclined chute at the opposite side of the conveyor to receive the package.

The system 10 may be easily adjusted to compensate for the size of the leak to be tested. The adjustment can be made, for example, by adjusting the size of the spaces or openings between the louvers to restrict the amount of air passing therethrough or by varying the package to louver separation or the louver to strip separation. The louvers, however, preferably are used for fine tuning the adjustment.

As shown in FIG. 1, a plurality of boxes 18 with detecting means therein may be employed along each side of the conveyor. In a preferred arrangement as shown in FIG. 1, the conveyor 38 initially travels in the direction shown by arrow 46 until a package 12 is under an appropriately positioned solenoid 40 whereby one side of the package 12 faces one box 18 while an adjacent side of the package faces another box 18. When the solenoid is activated, the system is able to detect leaks on the two adjacent sides. The conveyor direction then changes at a right angle to go in the direction of arrow 48. The package is then moved to a position shown in the top of FIG. 1 whereby the two other untested adjacent sides of the package 12 are each facing a box 18. Another solenoid 40 is then activated and the other two adjacent sides are tested for leaks. The conveyor direction again changes at a right angle whereby the package is then moved in the direction of arrow 50 for further handling. In this manner all four sides of the package may be tested for leaks in an automatic manner.

It is apparent from the above detailed description that many advantageous features are provided by the present invention. A package seal inspection system for detecting leaks in a seal package is provided which is automatic in operation, whose sensitivity may be readily adjusted and which is cost effective in inspecting packaged goods. Another advantage of this invention is that an operator may observe the system in action and by noting which of the hanging strips are displaced, can determine the point on the seal that contains a leak. Moreover, the system can test for leaks in a large range of package sizes and shapes as long as the packages are sufficiently flexible to permit the striking solenoid to force air from the package at the point where a leak occurs.

Numerous alterations and modifications of the structure herein disclosed will suggest themselves to those skilled in the art. It is to be understood, however, that the present disclosure relates to the preferred embodiments of the invention which is for purposes of illustration only and is not to be construed as a limitation of the invention. All such modifications which do not depart from the spirit of the invention are intended to be included within the scope of the appended claims.

We claim:

1. A package seal inspection system for detecting leaks in a sealed package comprising:
    (a) a box having front and back walls;
    (b) a plurality of louvers mounted in said front wall;
    (c) a plurality of strips mounted in said box behind said louvers;
    (d) means mounted in said box behind said strips for detecting movement of said strips;
    (e) means for supporting said package in front of said louvers; and
    (f) means for applying pressure to a surface of said package whereby when a leak is present in said package, air in said package is forced out and through said louvers to cause at least one of said strips to move and be detected by said detecting means.

2. A package seal inspection system as recited in claim 1 wherein said detecting means comprises a light emitter and a light detector.

3. A package seal inspection system as recited in claim 2 wherein said light emitter comprises an infrared emitter.

4. A package seal inspection system as recited in claim 1 wherein said box includes an opening for the exit of air therefrom.

5. A package seal inspection system as recited in claim 1 wherein said louvers are angularly adjustable.

6. A package seal inspection system as recited in claim 1 wherein said supporting means comprises a conveyor.

7. A package seal inspection system as recited in claim 6 which includes a plurality of said boxes with detecting means therein, mounted along said conveyor.

8. A package seal inspection system as recited in claim 1 wherein said pressure applying means comprises a solenoid.

9. A package seal inspection system for detecting leaks in a sealed package comprising:
    (a) a box having front and back walls;
    (b) a plurality of angularly adjustable louvers mounted in said front wall;
    (c) a plurality of strips mounted in said box behind said louvers;
    (d) means mounted in said box behind said strips for detecting movement of said strips, said means comprising a light emitter and a light detector;
    (e) a conveyor for supporting said package in front of said louvers; and
    (f) means for applying pressure to a surface of said package whereby when a leak is present in said package, air in said package is forced out and through said louvers to cause at least one of said strips to move and be detected by said detecting means.

10. A package seal inspection system as recited in claim 9 wherein said light emitter comprises an infrared emitter.

11. A package seal inspection system as recited in claim 9 wherein said box includes an opening for the exit of air therefrom.

12. A package seal inspection system as recited in claim 9 which includes a plurality of said boxes with detecting means therein, mounted along said conveyor.

13. A package seal inspection system as recited in claim 9 wherein said pressure applying means comprises a solenoid.

* * * * *